(No Model.) 3 Sheets—Sheet 1.
A. DESGOFFE & L. A. DI GIORGIO.
APPARATUS FOR EXTRACTING JUICES FROM ANIMAL AND VEGETABLE SUBSTANCES.
No. 287,010. Patented Oct. 23, 1883.
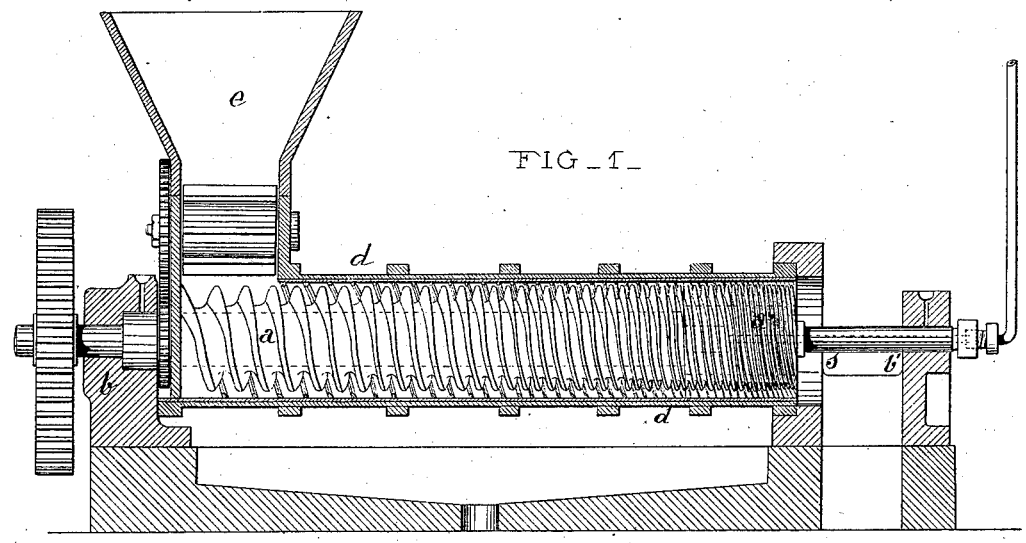
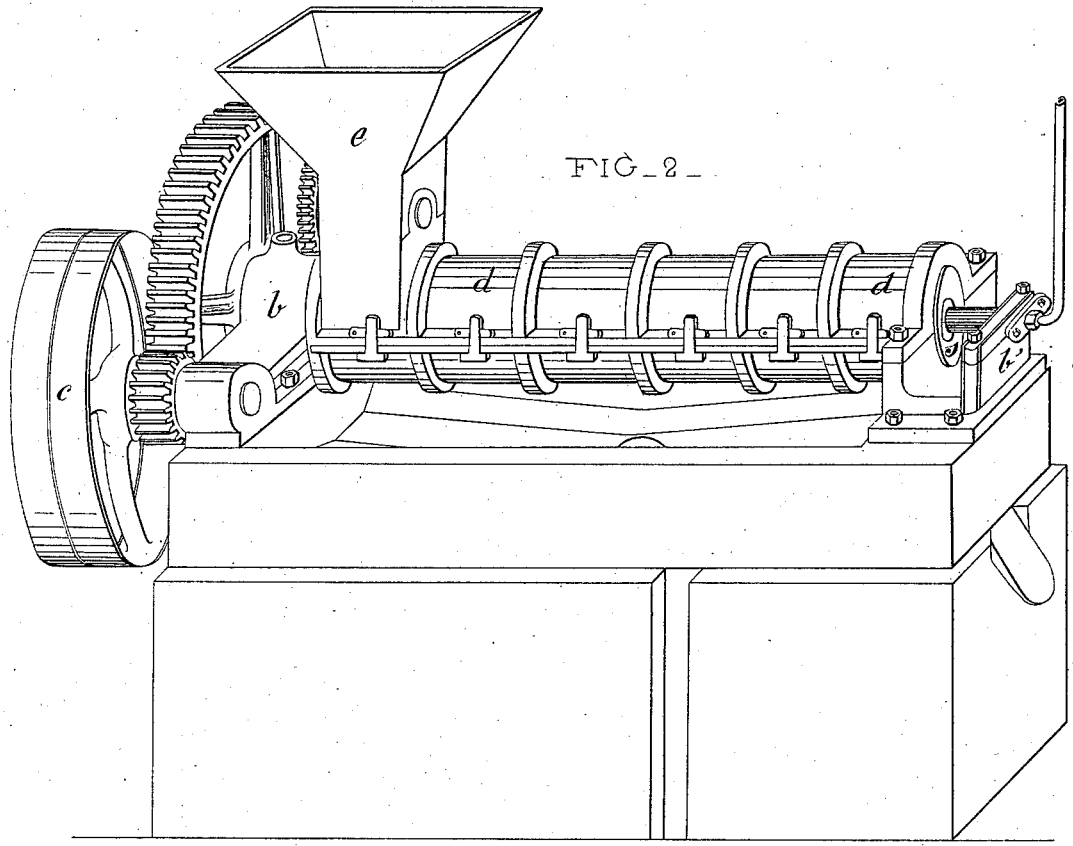

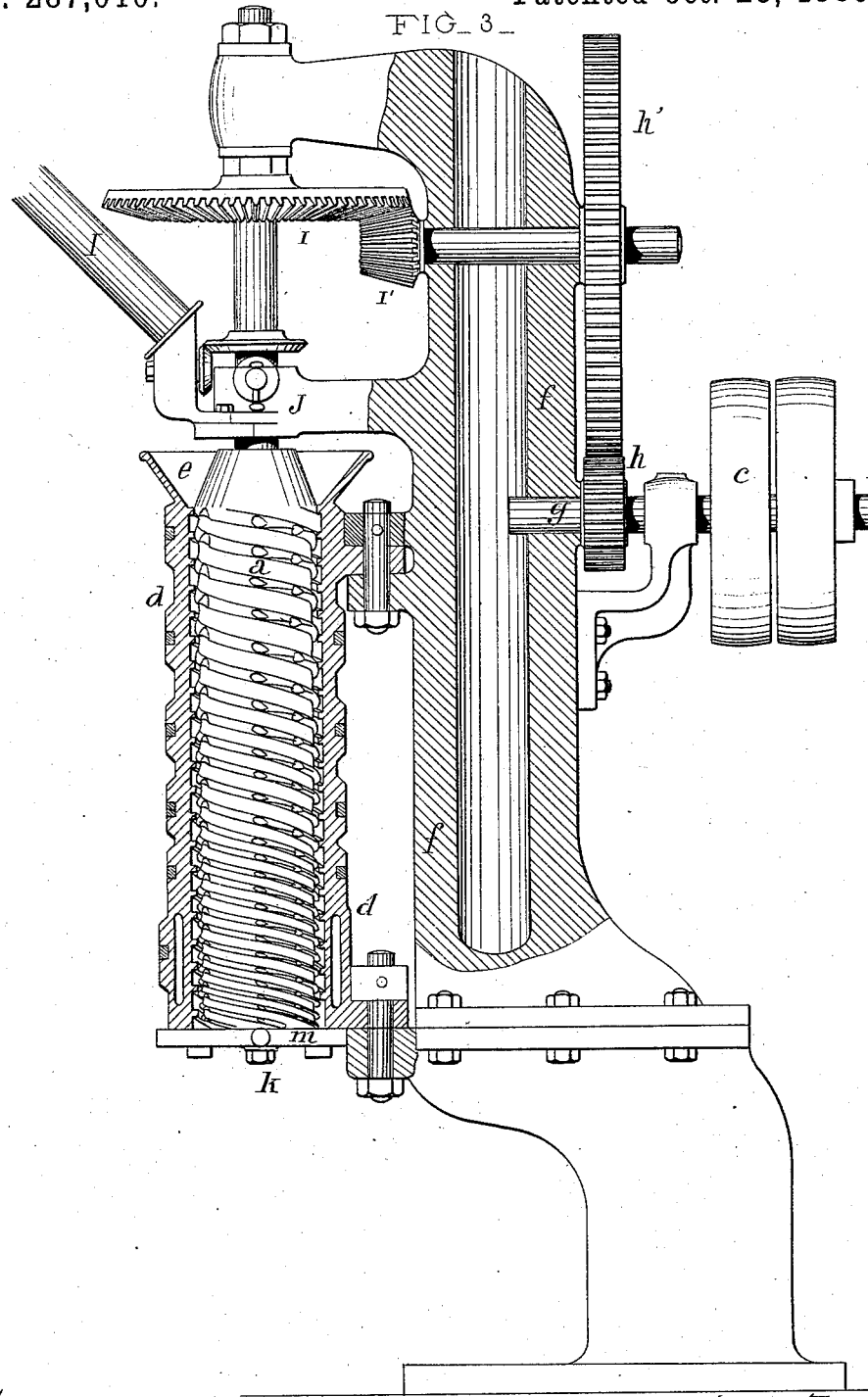

(No Model.) 3 Sheets—Sheet 3.
A. DESGOFFE & L. A. DI GIORGIO.
APPARATUS FOR EXTRACTING JUICES FROM ANIMAL AND VEGETABLE SUBSTANCES.
No. 287,010. Patented Oct. 23, 1883.
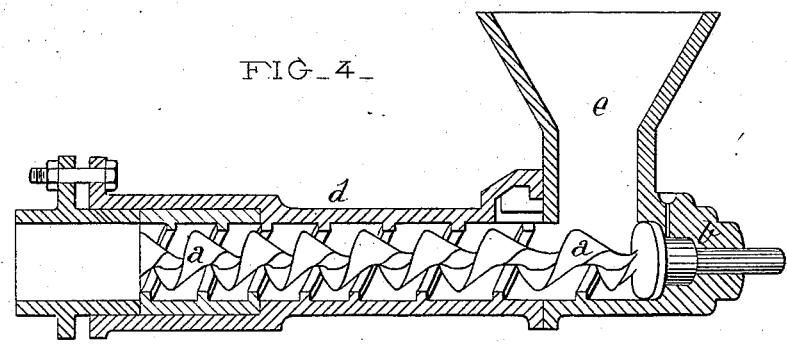
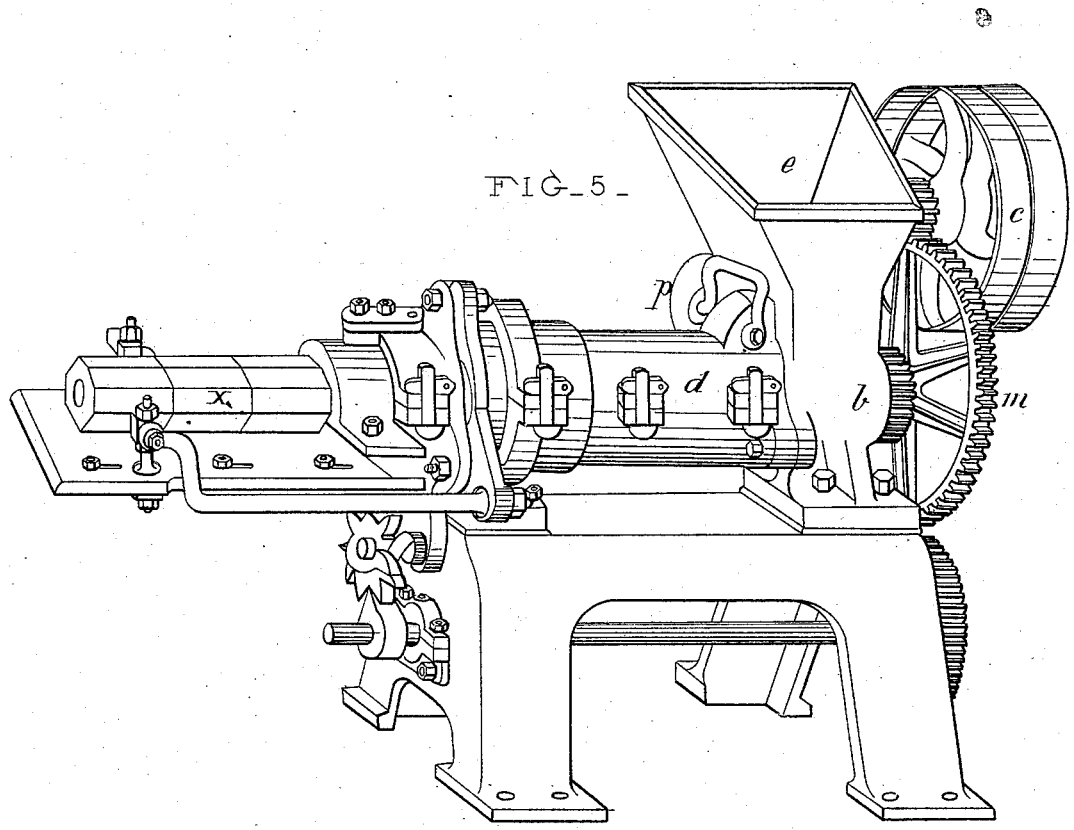

UNITED STATES PATENT OFFICE.

AUGUSTE DESGOFFE, OF PARIS, FRANCE, AND LEONIDAS A. DI GIORGIO, OF ODESSA, RUSSIA.

APPARATUS FOR EXTRACTING JUICES FROM ANIMAL AND VEGETABLE SUBSTANCES.

SPECIFICATION forming part of Letters Patent No. 287,010, dated October 23, 1883.

Application filed August 24, 1883. (No model.) Patented in France September 28, 1881, No. 145,048, in Belgium October 3, 1881, No. 55,880; and in England July 19, 1883, No. 3,548.

*To all whom it may concern:*

Be it known that we, AUGUSTE DESGOFFE, civil engineer, a citizen of France, residing at Paris, and LEONIDAS A. DI GIORGIO, mechanic, a resident of Odessa, in the Empire of Russia, have invented new and useful improvements in apparatus for expressing the juices of various matters, and for crushing, bruising, grinding, pulverizing, mixing, and for kneading mineral, animal, and vegetable substances, (for which we have obtained patents in Great Britain, No. 3,548, bearing date July 19, 1883, for fourteen years; France, No. 145,048, dated September 28, 1881, for fifteen years, and Belgium, No. 55,880, dated October 3, 1881, for fifteen years,) of which the following is a specification.

The object of the apparatus is, first, to extract the liquid, fatty, or viscous matters from all kinds of mineral, vegetable, or animal matters submitted to its action; second, to separate from liquid matters the elements of different densities of which they are composed; third, to crush, bruise, pulverize, knead, or mix all matters of a solid, liquid, or semi-liquid composition, in order to effect the results hereinafter described.

In the accompanying drawing, Sheet 1 shows in vertical section, by Figure 1, one of the arrangements, of which a perspective view is shown by Fig. 2.

A screw, $a$, with decreasing thread, pivoting at its two extremities in the blocks $b\ b'$ of the frame, is set in motion by a crank or a pulley, $c$, mounted directly on the axis of the screw, or connected with it by gear-work, as shown in the drawings, or by belts, friction-plates, or other intermediaries. The screw turns freely, but without being loose, in a pipe or case, $d$, which is pierced with holes, and furnished with spirals placed in a position opposed to the blades, forming the thread of the screw. This pipe bears at $e$ a hopper, the lower end of which debouching on the blades of the screw serves for the introduction of the matter to be compressed, while recipients or basins are placed beneath this pipe at the opposite end to catch the liquid and residues expelled.

*Action of the apparatus.*—The crank or pulley $c$ being set in motion and the matter to be operated on being placed in the hopper $e$, it will easily be understood that it penetrates and enters the blades of the screw and the spirals or projections of the pipe or case $d$, the thread of the screw drawing the matter toward the exit $s$, and it will be seen that as the substance advances the more closed is the space it has to pass through. As the blades or thread of the screw gradually decrease in size toward the exit $s$, the matter therefore is gradually reduced, so that it is easily expelled after passing the movable part $a'$, placed at the exit, and which determines and restricts the degree of reduction of the matter. The advantage of this piece being movable is that it can be changed when worn, or replaced by another of the dimensions required; but the reduction of the matter in this progressive manner would be futile were it not effected, as is the case, by the combined action of the two concentric screws, one being the screw $a'$, and the other forming spirals on the inside of the case or pipe $d$, both spirals, blades, or threads being opposed to one another, and which, by their slope, force the matter to take a rectilinear course to the exit. Moreover, the matter, being from its entry into the blades or spirals of the thread revolved in its many evolutions, is continually under pressure between the screw and the spirals of the pipe, all its molecular particles are pressed, and any liquid contained in the matter is expressed as it passes along in its course, the result being that on reaching the point of exit the matter is reduced to its smallest constituent particles.

Sheet 2 shows in section an apparatus as described, but working in a vertical position. A vertical frame, $f$, bears an axis, $g$, to which the crank or driving-pulley $c$ is fixed. A toothed pinion, $h$, gears with the wheel $h'$, mounted on the axis of the conical wheel $i'$, which latter actuates the bevel-wheel $i$, fixed on the axis of the screw $a$. This screw turns in the block $j$ at the head of the frame, and pivots at its lower end in the stuffing-box $k$. It is formed like the first-named screw, of a number of threads or blades, gradually decreasing in dimensions as it nears the exit. Its diameter and length would vary according to the degree of crushing, bruising, squeezing or kneading it is desired it should perform on the substance to be treated. Like the first, it turns freely, without being loose, in a case or pipe, $d$, furnished with spirals placed in a position opposed to that of the threads of the screw. These, as well as the spirals of the pipe, bear notches or spaces, which allow the matter under treatment to remain stationary intermittently during a part of its progress. These stoppages, which are optional, are repeated throughout the length of the screw, which produces an intimate mixture of the substance, which is kneaded and crushed simultaneously. The paste or dough thus worked makes its exit at $m$, where it is expelled either at once in the form of paste, (if it consists of wheat and water,) or it is forced through a mold of some kind and shape, which gives it the form of vermicelli, macaroni, and so on. With this view distributers I, placed at the upper part of the apparatus, empty into the hopper $e$ of the pipe $d$ the substances that are required for preparation. Spaces are made in the screw and the case or pipe for either heating or refrigerating the matters, as desired.

Sheet 3 shows, by the section Fig. 4, and external view, Fig. 5, another modification of the same apparatus. A screw, $a$, supported by its axis $b$, bears at $m$ a toothed wheel in gear with a driving-pinion. This screw turns freely in a pipe with spirals, as before arranged, and bears at $e$ a hopper whose lower orifice debouches on the blades of the screw, in which the matter is drawn along by the wheel $p$, so that the substances receive a crushing, grinding, or kneading in proportion to the decrease of the threads or blades of the screw, and are finally ejected by the last thread of the screw into a mold, $x$, where it takes the desired form, (according to its composition,) either in the shape of cakes or bricks, plain or hollow pipes, tiles, artificial stone, and so on, if the machine is to work clay.

In each of its applications the accessories for cutting, marking, shaping, and so forth, as well as the points of exit of the matter, vary in dimensions as well as in composition.

*Observations.*—The screw can have its threads or blades of any mathematical or practical form. It may have a single thread, or as many as twenty, if desired, according to its diameter and its application, and it can pivot at one or both its ends. It may be solid or hollow, and furnished with pipes for the circulation of hot or cold water or steam. It may be pierced for the flow of the juices, and may be of a single piece or of several parts joined together end to end. The axles may be fixed to it or be of a piece with it. It may be of metal, wood, or composed of both, or otherwise.

The threads or blades may be cast with the axis or fixed to it, and lined with metal, or covered with enamel of some sort.

The case may be of a single piece or separated lengthwise, or in its diameter in two or more parts or sections. It may be solid or hollow throughout or in part. It may be pierced or furnished with sheet metal perforated or lined with filtering-cloth. It may have compartments admitting of the circulation of hot or cold water or steam, as may be desired. It may be of metal, stone, or any other substance. The spirals may be cast with the case or pipe, or fixed to it, or form a separate piece, or be separated from it by a filtering-cloth. The section, form, and dimensions of the spaces of the spirals in the case or pipe are variable, according to the employment they are intended for. The spaces may be regular throughout the length of the case or pipe, and they may decrease in width for a part or for the whole length, and their inclination with respect to the screw may vary from an angle to a circular section, or may be parallel with the axis. The spirals, as well as the screw, may be in straight lines, the thread being continuous or intermittent, striated, grooved, or otherwise formed, solid or hollow, chased or not. In certain cases a cloth tissue is interposed between the spirals and the case. In other instances the perforated sheet bears the spirals. Finally, the case may be a simple filter supported or not for part or throughout its length by metal bars or bands.

The hopper may be placed at the axis of the screw or at the side.

To the pulley or driving-crank any kind of gear-work may be added—such as frictional plates or any other force-multiplier.

The apparatus may be horizontal, vertical, or inclined, as required. Basins, troughs, or pipes for carrying the substances away may be constructed with the frame, or be added to it, according to the disposition of the apparatus, and the matter or substance may be conveyed in the screw by means of eccentrics, pumps, cylinders, or other propelling means, and the quantity may be regulated by a distributer or counter, meter, or otherwise.

The molds may be of various compositions, forms, and dimensions, according to the results to be effected. A single apparatus may be both expelling, crushing, and kneading, or be the subject of two or more classes. Its applications are varied. For instance, in sugar-factories for extracting the juices of the beet-root, sugar-cane, purifying the sugar of lime of molasses in making crystallized sugar; presses for extracting water from starch of potatoes and other tubers; in extracting the juice of grapes in making wine, or the juice of apples for cider; in extracting the juice of herbs and roots, cooked or uncooked fruit, honey, the juice of meats, chemical products, essences of flowers; for pressing hay to pack it economically; in pressing bran; in the making of purées, sweetmeats, preserves, and for culinary purposes; in the extracting of oil from oleaginous grain, fruits, almonds, fish of all kinds; in grinding rye, maize, rice, and other cereals without decortication, and in converting the same into paste or dough, and in almost all industries where such apparatus is serviceable—such as color-grinding, butter-making, crushing salt or sugar, in candle-making, in the manufacture of manure; for pottery, china, glass, and so on; all kinds of earthenware, artificial stone, bricks, tiles, pipes, slabs, and so forth.

We claim as our invention—

1. The screw with decreasing thread, combined with a case or pipe which is supplied internally with helical spirals placed opposite to those of the screw, substantially as described.

2. The combination of the screw $a$ and separate loose screw $a'$ on the same shaft, with the case or shell $d$, having internal decreasing thread opposed to the threads of said two screws, substantially as herein shown and described.

3. The combination of the screw $a$, having decreasing thread and notches therein, with the case or shell $d$, having opposing thread and notches therein, substantially as specified.

4. The combination of the screw, having decreasing thread, with the shell $d$, having spirals in an inverse sense, and with the mold $x$, substantially as herein shown and described.

AUGUSTE DESGOFFE.
LEONIDAS A. DI GIORGIO.

Witnesses:
T. KESSAN,
C. TCHORBEGEAGLE.